United States Patent [19]
Hoffmann

[11] Patent Number: 4,776,507
[45] Date of Patent: Oct. 11, 1988

[54] DEVICE FOR CLAMPING AND CENTERING OF TWO PARTS TO BE WELDED TOGETHER

[75] Inventor: Dieter Hoffmann, Berg.-Gladbach, Fed. Rep. of Germany

[73] Assignee: Oxytechnik GmbH, Fed. Rep. of Germany

[21] Appl. No.: 894,463

[22] Filed: Jul. 31, 1986

Related U.S. Application Data

[63] Continuation of Ser. No. 526,697, Aug. 26, 1983, abandoned.

[30] Foreign Application Priority Data

Sep. 11, 1982 [DE] Fed. Rep. of Germany ....... 3233796

[51] Int. Cl.[4] .............................................. B23K 37/04
[52] U.S. Cl. ........................................ 228/42; 29/252; 29/272; 228/49.3; 269/48.1
[58] Field of Search ...................... 228/49.3, 42, 48, 50, 228/219; 269/48.1; 279/2; 29/252, 272, 282; 92/128, 59

[56] References Cited

U.S. PATENT DOCUMENTS

| Re. 28,190 | 10/1974 | Force et al. | 228/44.5 X |
|---|---|---|---|
| 409,008 | 8/1889 | Breymann | 29/282 |
| 2,344,939 | 3/1944 | Bennett | 29/282 X |
| 2,736,286 | 2/1956 | Britton | 269/48.1 |
| 2,766,532 | 10/1956 | Eisele | 279/2 X |
| 2,767,676 | 10/1956 | Johnson et al. | 269/48.1 |
| 2,767,677 | 10/1956 | Johnson et al. | 269/48.1 |
| 2,977,916 | 4/1961 | Hawkins | 29/272 X |
| 3,118,683 | 1/1964 | Hoshizaki | 279/2 |
| 3,284,883 | 11/1966 | Haverfield et al. | 228/49 B X |
| 3,330,366 | 7/1967 | Lowry et al. | 279/2 X |
| 3,472,524 | 10/1969 | Mansell | 279/2 |
| 4,084,739 | 4/1978 | Koltz et al. | 228/219 X |
| 4,387,845 | 6/1983 | Mefferd | 269/48.1 X |
| 4,393,674 | 7/1983 | Rasmussen | 29/252 X |
| 4,418,860 | 12/1983 | La Force | 228/44.5 |
| 4,483,477 | 11/1984 | Echold et al. | 228/49.3 X |

FOREIGN PATENT DOCUMENTS

| 134609 | 3/1979 | German Democratic Rep. | 269/48.1 |
|---|---|---|---|
| 1228495 | 7/1963 | Fed. Rep. of Germany . | |
| 1965665 | 7/1970 | Fed. Rep. of Germany . | |
| 2006441 | 4/1971 | Fed. Rep. of Germany | 279/2 |
| 2522465 | 12/1976 | Fed. Rep. of Germany . | |
| 2708040 | 4/1979 | Fed. Rep. of Germany . | |

*Primary Examiner*—Kenneth J. Ramsey
*Attorney, Agent, or Firm*—Connolly & Hutz

[57] ABSTRACT

A device is provided for clamping and centering two parts to be welded together, such as a flange or edge against a pipe or two pipes against each other, or a pipe against a pipe, so that the parts can be welded together in a clamped position. The device comprises a clamping tool which is in the form of a portable, manually operable unit. The tool preferably has clamping tongs with interchangeable clamping pins for interior clamping.

34 Claims, 11 Drawing Sheets

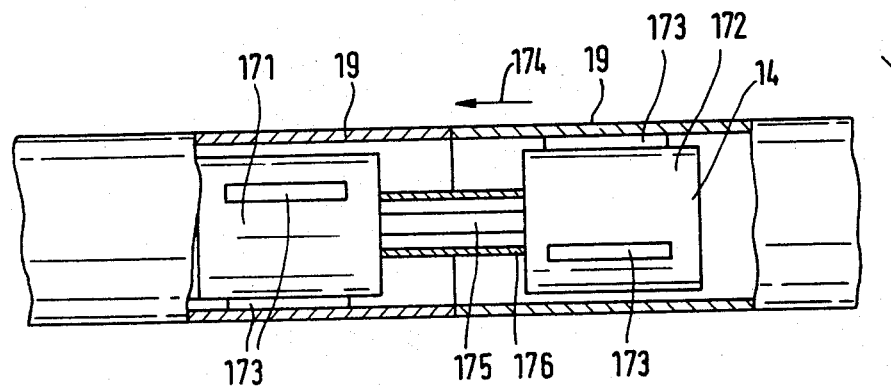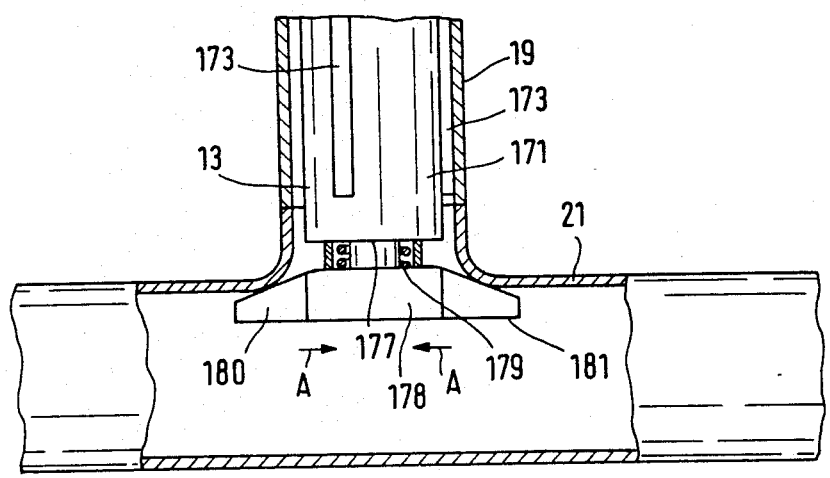
FIG. 9

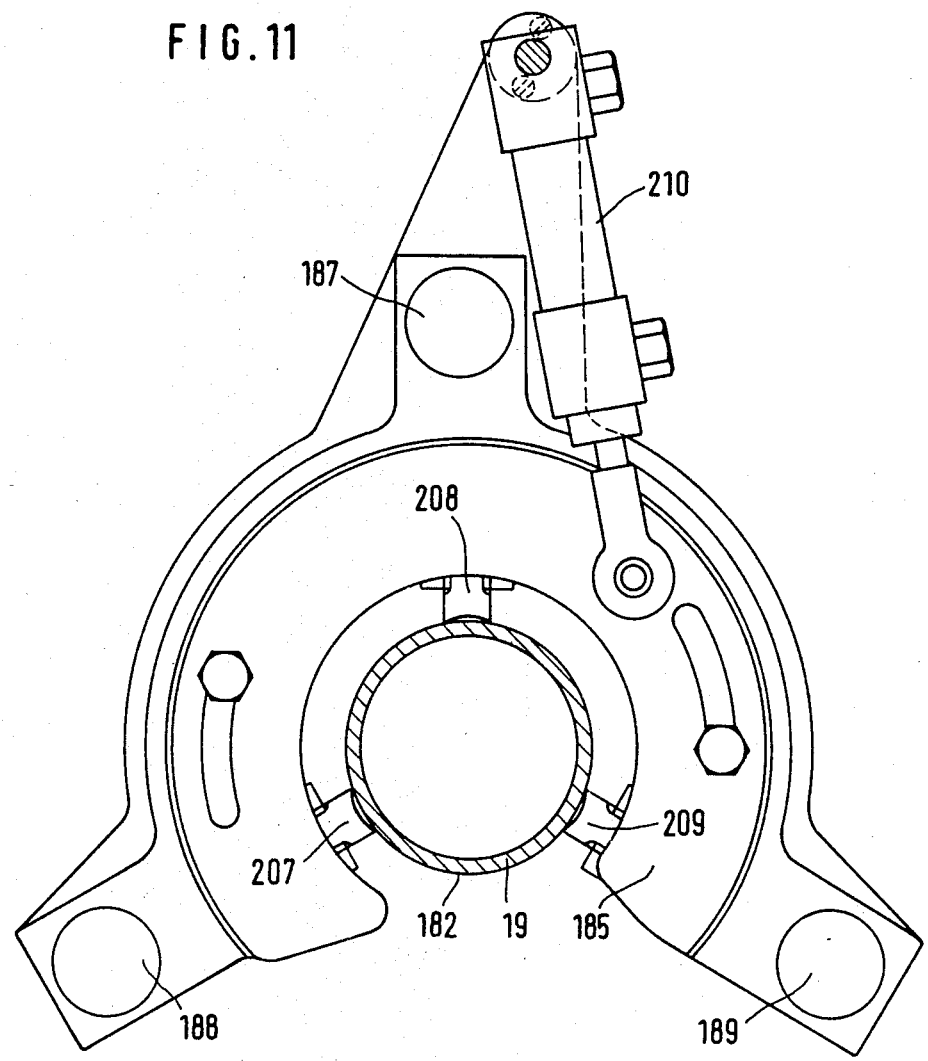

DEVICE FOR CLAMPING AND CENTERING OF TWO PARTS TO BE WELDED TOGETHER

CROSS REFERENCE TO RELATED APPLICATION

This application is a continuation of application Ser. No. 526,697, filed Aug. 26, 1983, now abandoned.

BACKGROUND OF INVENTION

The invention concerns a device for clamping and centering of two parts which are to be welded together, such as, e.g., flange or edge against pipe, pipe to pipe, flared-out pipe against pipe, whereby the two parts can be welded together in the clamped position.

In machine construction and installations, the purpose of a device of the above-mentioned nature is to secure the spatial position of a workpiece, e.g., a pipe, against dislocation and turning, and to make it possible to partially or fully center it in a position where two end shapes fit against one another. For welding of the workpieces, the tension, centering and/or supply of shaping gas must be ascertained, as well as the intactness of the device.

In machine construction and installations, it is known how to accomplish the connection of rotationally non-symmetrical parts of pipeline installations, such as flange or edge against pipe, pipe to pipe, flared-out pipe against pipe, which will be referred to as welding parts in the following, namely in such a manner that the securing of the spatial position against dislocation or turning is achieved by means of stitching seams which are applied to the circumference of the parts to be connected and/or by means of welding tongs, vises or prisms.

In the case of such a connection, a number of different connectors and a considerable number of assembly personnel must be made available for producing the connection between the welding parts. This welded connection of, for instance, flange or edge against pipe, pipe to pipe, flared-out pipe to pipe, which has been produced with long production time and high production cost, will have different and varying quality of centering as well as of welding seam.

The width of the cylindrical turning device provided at the conical set-off, the diameter of which corresponds to the outside diameter of the pipe, is of particular importance of influencing the quality of the centering, e.g., in the case of connections of flange to pipe. Thus, for a pre-welding flange 50/75 DIN, i.e., nominal pre-welding width of 50 mm for an outside pipe diameter of 57 mm, the width of the set-off is approximately 8 mm. Bringing a pipe to a position flush with this setoff requires great manual skill and experience of the assembly crew, if the pipe is of a considerable length. Under practical circumstances, this task, e.g., a pre-welding flange of 50/57 DIN, which is to be welded to a rotationally non-symmetrical pipeline part with a length of 2.4 m, represents, in addition to new installations, a large percentage of all cases of repairs of pipeline installations as well as of assembly or connection of such installation portions at construction sites. The time required for orientation or centering is many times that required for pure welding/connection work. In addition to achieving this form-fitting centering for connection of the welding parts for pipelines and mountings, it is also necessary to arrange or align the screw holes in the flange in such a manner that they are symmetrical to the two main axes, this in order to achieve a symmetrical positioning of the holes. This requires additional effort in the centering.

Assuming constant welding performance, the quality of the welding connection is influenced by the centering of the welding parts in relation to one another and the uniform filling of the seam joint. If the centering is made by hand or by means of welding tongs, only insufficient form fitting of the welding parts and insufficiently uniform filling of the seam joints partially filled by stitch seams can be achieved.

SUMMARY OF THE INVENTION

The object of the invention is to create a clamping and centering device which is easy to handle and by means of which it is also possible to achieve form fitting of the welding parts and to secure them in the spatial position against turning or dislocation in the simplest possible manner while avoiding both stitching seams and wasted working time.

According to the invention, this problem is solved thereby that the clamping tool for the welding parts is designed as a portable unit that can be manually operated.

In order to make such a clamping tool universally useful—i.e., for different pipe diameters—the clamping tool is provided, according to an additional advantageous execution of the invention, with clamping tongs with interchangeable clamping pins for internal strain.

Advantageously, the clamping tool for pipe to pipe connections as well as for flared-out pipe against pipe will have two clamping units which can be moved in relation to one another in order to center the welding parts into the welding position.

The advantages obtained with the invention consist particularly therein that a form-fitting centering and tension thus a connection of the welding parts at an arbitrary position of the rotationally non-symmetrical pipeline installation, can be made in a short period of time with the aid of the portable, manually operable clamping tool, e.g., clamping tongs and clamping pins. The time saving when the clamping tool is used is between thirty and fifty percent. An imprecise centering, which is time consuming and requires large manpower, is thus eliminated, as is the work procedure of stitching. As an advantageous consequence, it will not be necessary to weld over the stitching seams in the continued work process, and this contributes to an improvement of the quality of the welding seam.

Another significant advantage is the simple structure and the uncomplicated use of the device according to the invention, which makes it possible to utilize personnel trained on the job rather than in a formal training program. This is an advantage, particularly since the time used for centering and clamping is required in addition to actual operational time.

THE DRAWINGS

FIG. 9 is a schematic representation of the clamping pins for internal clamping of pipe to pipe, and flared-out pipe to pipe;

FIG. 11 is a front view of the tongs shown in FIG. 10.

DETAILED DESCRIPTION

Figure 1:
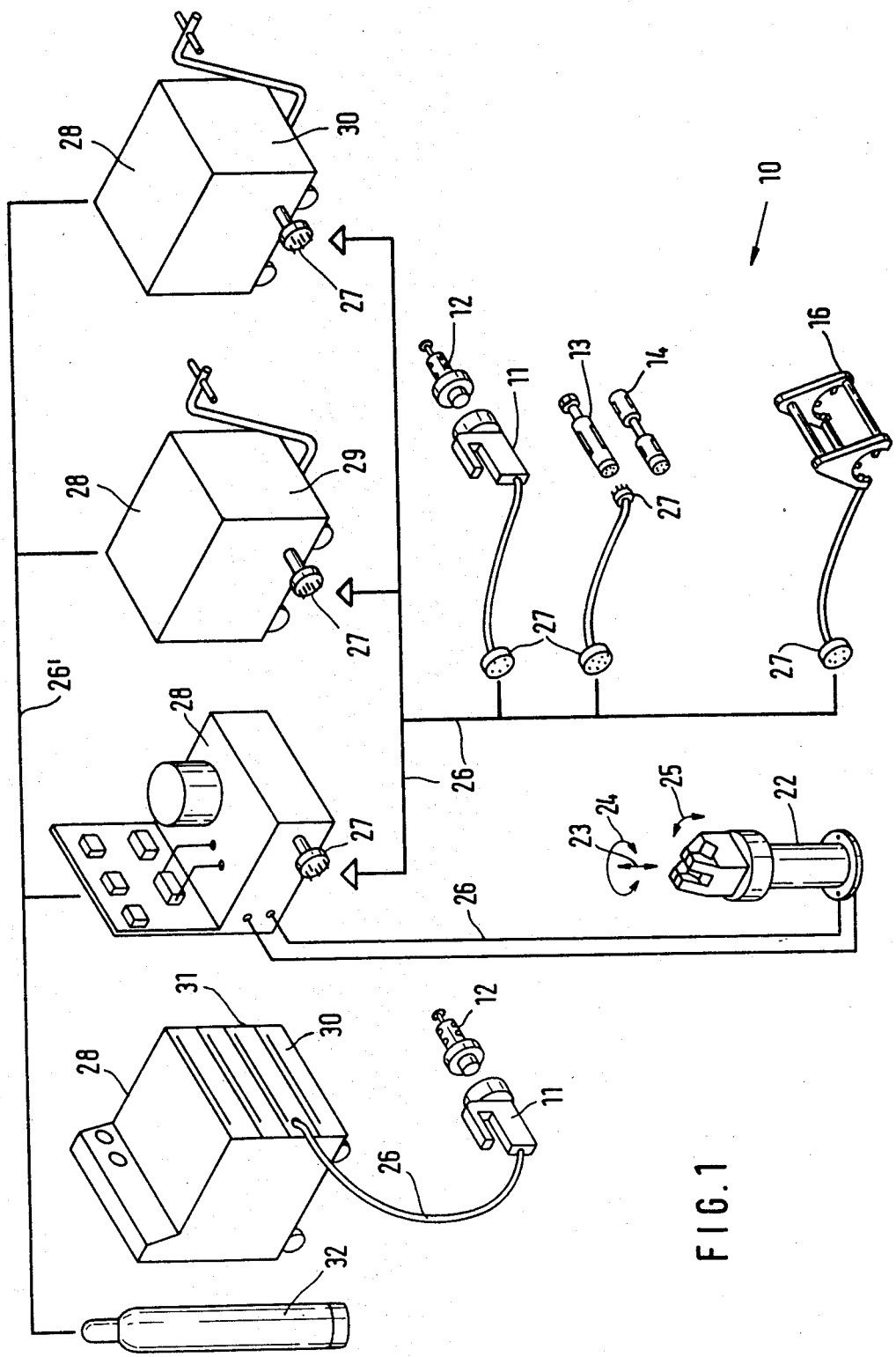
FIG. 1 is a schematic partial view of the clamping tool in accordance with the invention.

Schematically, FIG. 1 shows an overview of the parts of the portable, manually operable clamping tool 10, which consists of the units for internal clamping, namely clamping tongs or mandrel holder 11, clamping pin or mandrel 12 for connection of V-flange 17 (FIG. 5) and V-flare 18 (FIG. 5) against pipe 19, clamping pins 13 for connection of pipe 19 against flared pipe 21 (FIG. 9), clamping pins or mandrel 14 for connection of pipe 19 against pipe 19, and the unit for external clamping, namely clamping device 16 for connection of pipe 19 against pipe 19. Partially completed welding parts (17, 18, 19, 21) are held in a stationary centering clamping block 22, which rests in bearings so that it can be vertically adjusted (directions of the arrow 23), turned (directions of the arrow 24), and tilted (directions of the arrow 25) in relation to the center axis.

The clamping tool 10, the clamping device 16, and the centering clamping block 22 are connected to hydraulic pumping equipment 28, which may be either stationary or mobile, namely by means of pressure hoses or pipes 26 and rapid closure couplings 27. The hydraulic pumping equipment 28 has an electric drive 29, or, preferably, a pneumatic drive 30. When the hydraulic pumping equipment 28 is connected with the pneumatic drive 30, it is necessary to use a pressure converter 31 to convert the maximum air pressure (low pressure part) to a maximum operational pressure on the oil side (high pressure part).

A protective gas bottle 32 is connected to the supply network in order to provide the clamping tool 10 with forming gas.

Figure 2:
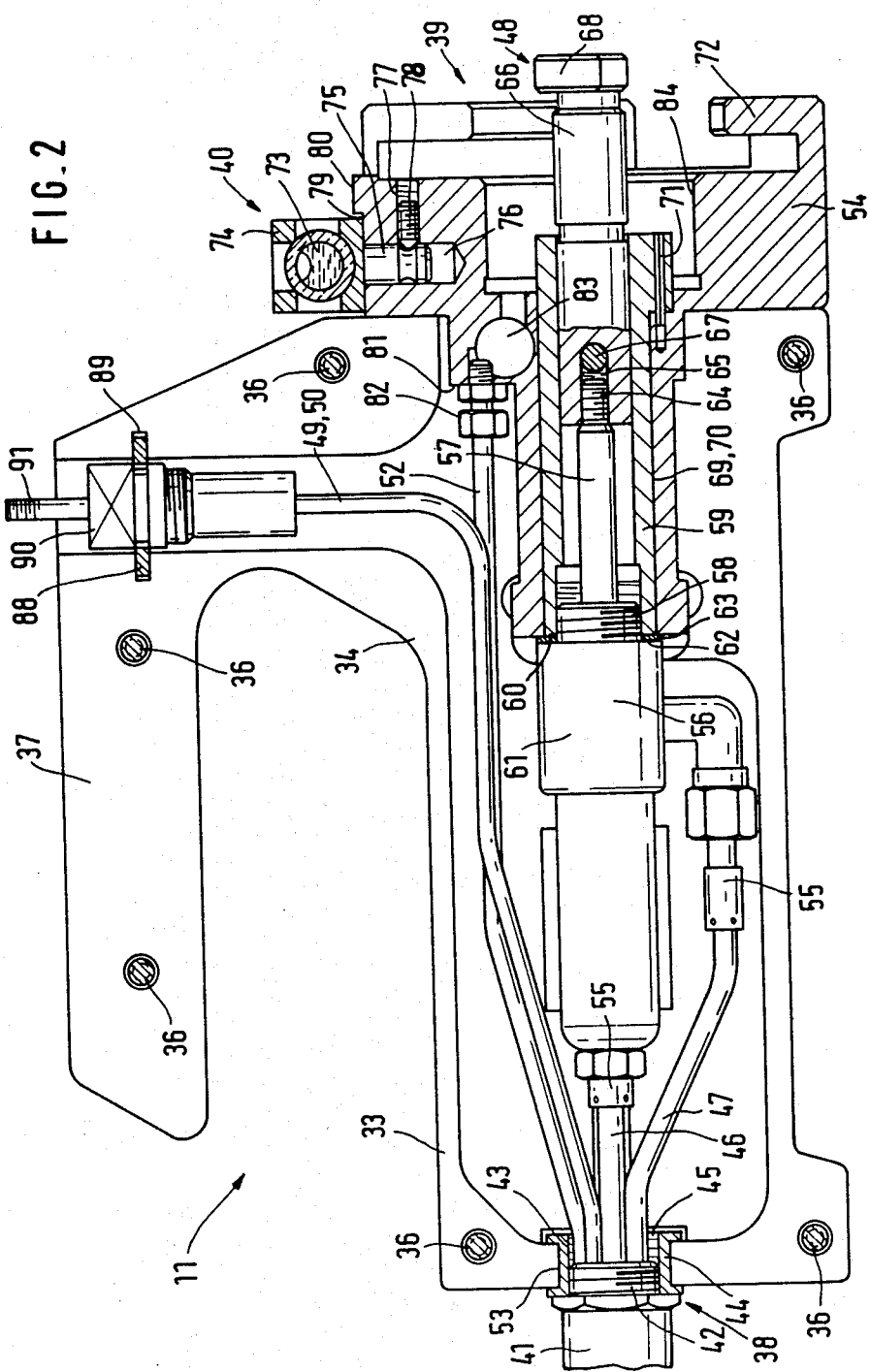
FIG. 2 is a complete cross-sectional side view of the clamping tool.
Figure 3:
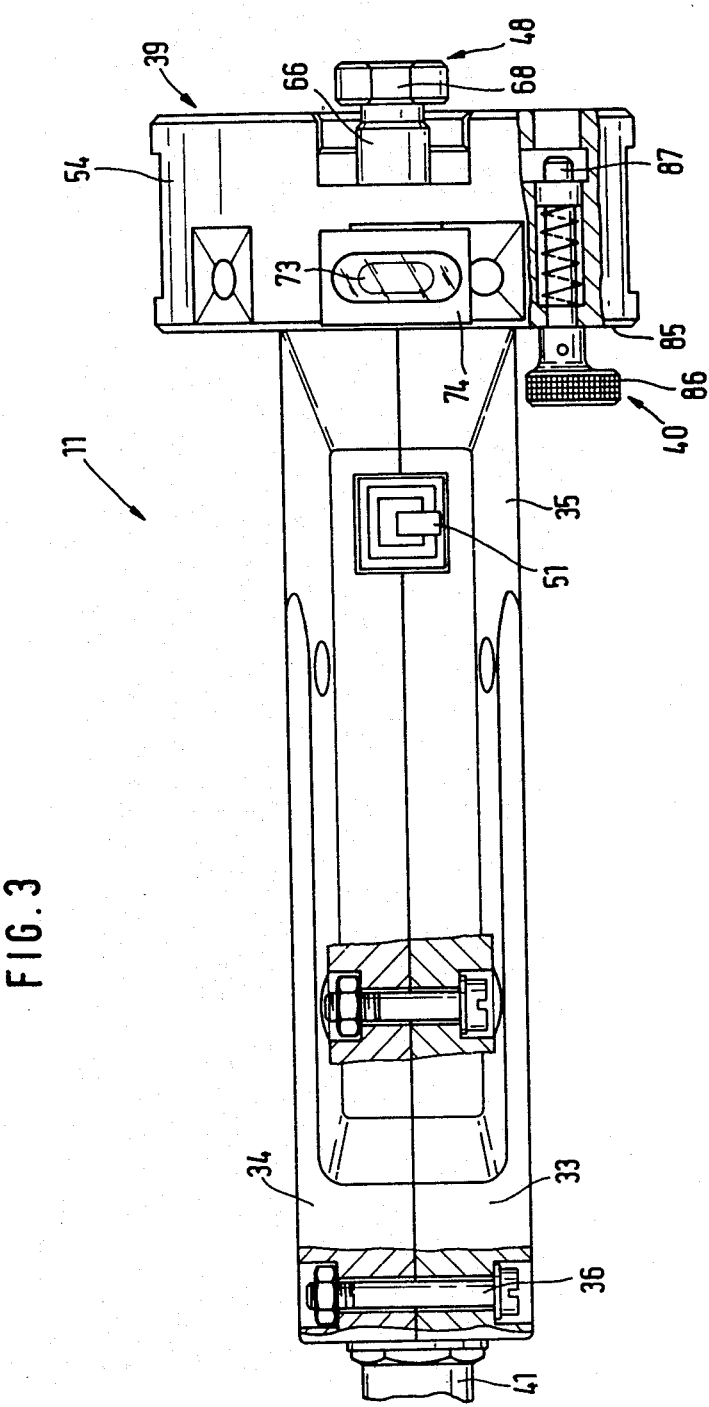
FIG. 3 is a partial cross section of a top view of the clamping tongs.

FIGS. 2 and 3 are sections showing details of the side view and the top view of the clamping tongs 11. The basic body of the clamping tongs 11 consists of a two-part housing 33, whereby the side portions 34 and 35 have a screw connection 36 and can be detached from one another. The top part of the housing 33 is designed as a handle 37, the rear part is designed as attachment 38 for the pressure hose, and the front part is designed as a device for coupling 39, clamping 48 and centering 40. By means of a rapid closure coupling 27 and pressure hoses 26, the clamping tongs 11 are connected to hydraulic pumping equipment 28 with preferably pneumatic drive 30 (FIG. 1). The pressure hoses 26 are encased within a protective hose, which is not shown in detail, whereby the protective hose is attached in a cutting ring 41. That part of the cutting ring 41 which faces the rear portion of the clamping tongs 11 is provided with an external threading 42 which interacts with the internal threading 43 of the threaded sleeve.

The threaded sleeve 44 has a fixed position in the housing 33, namely in a boring 53 in the rear face of the side parts 34, 35. The high pressure hoses 46, 47 for the clamping device 48, the hoses 49, 50 to the pressure converter 51, and the hose 52 to the coupling part 54 are led through the boring 45 in the threaded sleeve 44. The clamping device 48 consists of a double-action cylinder 56 with a piston rod 57, with single side effect, which is connected by means of plug type couplings 55 to the high pressure hoses 46, 47 which transport the hydraulic oil. In the area turning towards the piston rod 57, the cylinder 56 is developed as a threaded bolt 58 which is screwed into the guide part 59. A disk 63 of CuZn 49 Pb3 is located between the face 60 of the guide part 59 and the circular impact surface 62 formed by the threaded bolt 58 and the circular impact surface 62 formed by the threaded bolt 58 and the cylinder housing 61. In its frontal portion, the piston rod 57 is provided with an outside threading 64 which engages in the inside threading 65 of the coupling bolt 66. Vertically to the longitudinal axis of the housing 33, above the screw-in location 64, 65, a pin 67 is located in the coupling bolt 66 and guided in a slot provided in the guide part 59 but not shown in detail, and thereby, twisting of the coupling bolt 66 in connection with the slots is prevented.

At its unsupported end, the coupling bolt 66 moving in the guide part 59 consists of three circular segments 68. The guide part 59, the external periphery 69 of which is cylindrical, is located in the boring 70 in the coupling part 54 and connected with it by means of a spring dowel sleeve. That area of the coupling part 54 which is located inside the housing 33 is cylindrical, whereby the upper portion facing the handle 37 is executed as a turning element 81 for attachment of the hose 52 by means of a rapid screw connection 82. Via hose 52 and canals 83 located in the turning element 81, forming gas is led into the boring 84 which accommodates the clamping pin 12.

Figure 4:
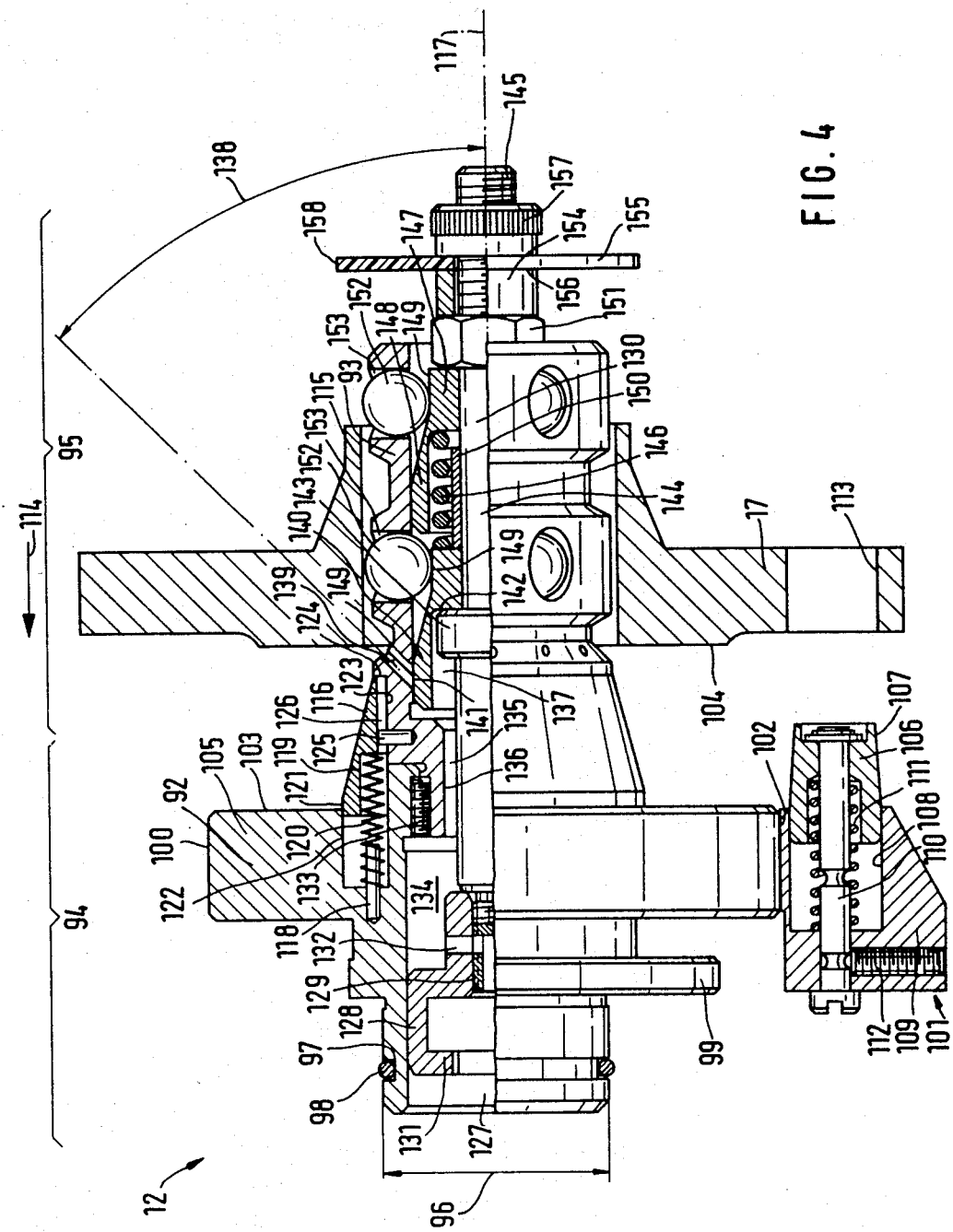
FIG. 4 is a clamping pin for internal clamping of a V-flange against a pipe, partial sectional representation.

In its front part which extends from the housing 33, the coupling part 54 consists of three coupling claws 72 for accommodating and locking the clamping pipe 12 (FIG. 4). In that area [of the coupling part] which faces the handle 37, a level 73 is arranged in a retainer angle 74. The attachment bolt 75 of the retainer angle 74 engages in the boring 76 of the coupling part 54 and is attached by means of a cylinder screw 78 which is provided in a threaded boring 77 provided vertically to the boring 76. The seat 79 of the retainer angle 74 is milled into the cylindrical circumference 80 of the front end of the coupling part 54.

On the face 85 of the coupling part 54, which is oriented towards the handle 37, there is a spring activated centering plug 86 which when the clamping pins 12 are coupled with the claws 72 in the clamping tongs 11 catches with the centering bolt 87 into a centering box located in the clamping pins 12 but is not represented in detail and which thus centers the clamping pins 12 in secure positions.

By means of the disk 88 which has a fixed position in the recess 89, a 3/2 directional valve 90 is attached in the handle 37 to which valve compressed air is supplied as a control medium via the hoses 49, 50. The switching of the 3/2 directional valve 90, which controls the functions of clamping/releasing and forming gas on/off, is mechanical and is effected via the pressure switch 51 which is connected to the threaded rod 91.

FIG. 4 represents details of a clamping pin or mandrel for internal clamping of a V-flange 17 with a nominal flange width before welding of 50 mm for an outside pipe diameter of 57 mm. The basic body of the clamping pin 12 consists of two swiveling parts 92, 93 connected with one another via threaded pins 133 and in its rear portion which faces the clamping tongs 11, it is developed as a coupling 94 while its front portion is developed as a clamping body 95.

The rear outside diameter 96 of the swiveling part 92 which has an O-ring recession 97 with an O-ring 98 at its circumference corresponds dimensionally with the dimensions of the accommodation boring 84 of the clamping tongs 11. After the coupling portion 99 of the clamping pin 12 has been turned in the coupling claws 72 of the clamping tongs 11, the O-ring rests against the circumference of the accommodation boring 84 and prevents uncontrolled outlet of forming gas. The face 103 of the swiveling part 92 which is oriented towards the area of the clamping body 95 rests perpendicularly to the longitudinal axis of the clamping pin and serves as a contact flange 105 for the screw-on side 104 of the V-flange 17. The center of the V-flange 17 which is pushed onto the clamping pin 12 by means of the boring 115 in the direction of the arrow 114 is centered by means of a conical box 116 which is elastically or resiliently guided in the face 103 of the contact flange 105 and additionally guided on the swiveling part 93.

The conical box 116 rests in bearings so that it can be moved resiliently with its cylindrical portion 121 by means of a spring 120 guided on pin 118 and boring 119, namely in boring 122 of the contact flanges 105 and guide surface 123 of the swiveling part 93 in the direction of the pipe axis 117. A contact surface 124 located on the guide surface 123 of the swiveling part 93 serves as an end stop for the travel of the conical box 116. The conical box 116 is secured against twisting by means of a pin 125 which is attached in the guide surface 123, the upper end of said pin extending from the guide surface 123 and engaging in a groove 126 on the conical box 116. When the V-flange 17 is moved in the direction of the arrow 114 to the face 103, the conical box 116 is pushed into the boring 115 of the V-flange 17 by the spring force acting against the direction of the arrow 114, and the V-flange 17 is centered. A centering device 101 is attached by means of screws which are not shown in detail to the milling 102 on the circumference 100 of the contact flange 105. The centering device 101 consists of an arresting bolt 106, conically developed in the forward area of the external circumference 107, which bolt is guided in a boring 108 of the basic body 109 which is screwed onto the contact flange 105 and which bolt is guided by a guide pin 110 which can be set in two positions. By means of a spring 111 connected to the guide pin 110, the elastic or resilient centering of the attachment borings 113 of the V-flange 17 symmetrically to the pipe axis 117 will be achieved after the stop 112 has been released.

A pressure propagation box 128 is arranged so that it can move in the boring 127 of the swiveling part 92 and in its front portion it is connected to the pressure bolt 130 by means of a threaded connection 129. The pressure bolt 130 is developed as a cylindrical shaft 144 to which the pressure flange 143 is joined, namely in the central portion, and as a threading 145, namely at the end oriented towards the clamping area 95. The circular segments 68 of the coupling bolt 66 of the clamping tongs 11 can be arrested by means of that portion of the pressure propagation box which in its rear portion is developed as a receiver part. The forming gas which is supplied via the boring 127 of the clamping tongs 11 is led via the radial boring 132 provided in the threaded connection 129 into a space 134 formed by the boring 127 and the front exterior diameter of the pressure propagation box 128. The forming gas flows via the annular slot 135 formed by the pressure bolt 130 and the inner wall 136 of the penetrating boring 137 to the outlet borings 139 located radially at an angle 138 in the swiveling part 93. When the clamping pin 12 is not activated, these outlet borings 139 are closed by the contact surface 141 by means of the wedge-shaped chuck ring 140. The pressure flange 143 provided on the pressure bolt 130 engages in the recess or boring 137 of the chuck ring 140 and moves the chuck ring 140 in the direction opposite to that of the arrow 114 when the pressure medium is supplied. A secondary chuck ring 147 is connected to the chuck ring 140 via a spring 146 and a box 150. In the same manner as the chuck ring 140, the secondary chuck ring 147 is also wedge shaped in its central portion 148 and cylindrical at its ends 149. Against axial dislocation in the direction opposite to that of the arrow 114 and for purposes of axial setting of the shift travel, the chuck rings 140, 147 are connected by means of a nut 151 which interacts with the threading 145. When the clamping pin 12 is not activated, balls 152 rest on the cylindrical ends 149 facing the threading 145 of the pressure bolt 130 which balls are guided in borings 153 in the swiveling part 93 surrounding the chuck rings 140, 147 and the pressure bolt 130.

Over the threading 145 of the pressure bolt 130 and resting with one face on the nut 151, there is a spacer sleeve 154 on the free face 156 of which a packing washer 155 is attached, preferably a rubber packing washer, namely by means of a knurled nut 157 engaging in the threading 145. After centering and clamping of a pipe 19, the outside circumference 158 of the packing washer 155 rests against the inside wall 159 of the pipe 19 (FIG. 6).

Figure 5:
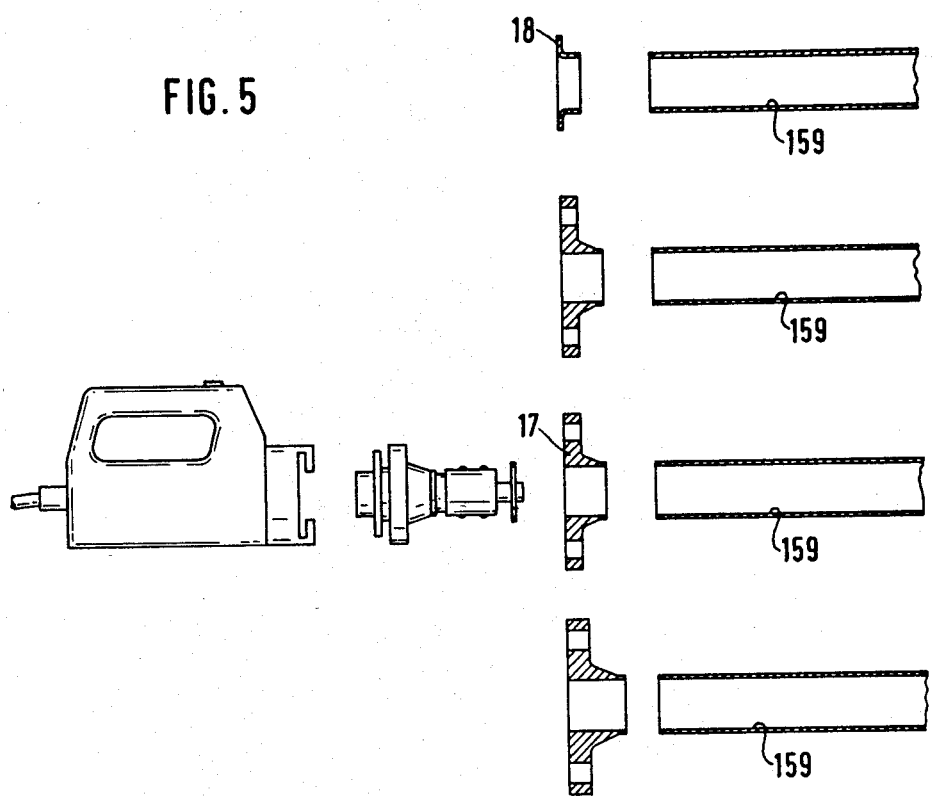
FIG. 5 is an overview of welding parts for the clamping tool comprising clamping tongs/clamping pin.

FIG. 5 gives an overview of the joints that can be clamped and centered by means of the clamping tongs 11/clamping pins 12. In each one of these cases, a clamping pin for a nominal width of the V-flange of 25, 40, 50, 65, 80, 100 mm is provided with the clamping tongs 11. Thereby, the practically significant joints of flange or edge against pipe consist of the material combinations VA-V flange against VA pipe, St-V flange against N pipe, and HD-ST-V flange against G pipe.

Figure 6:
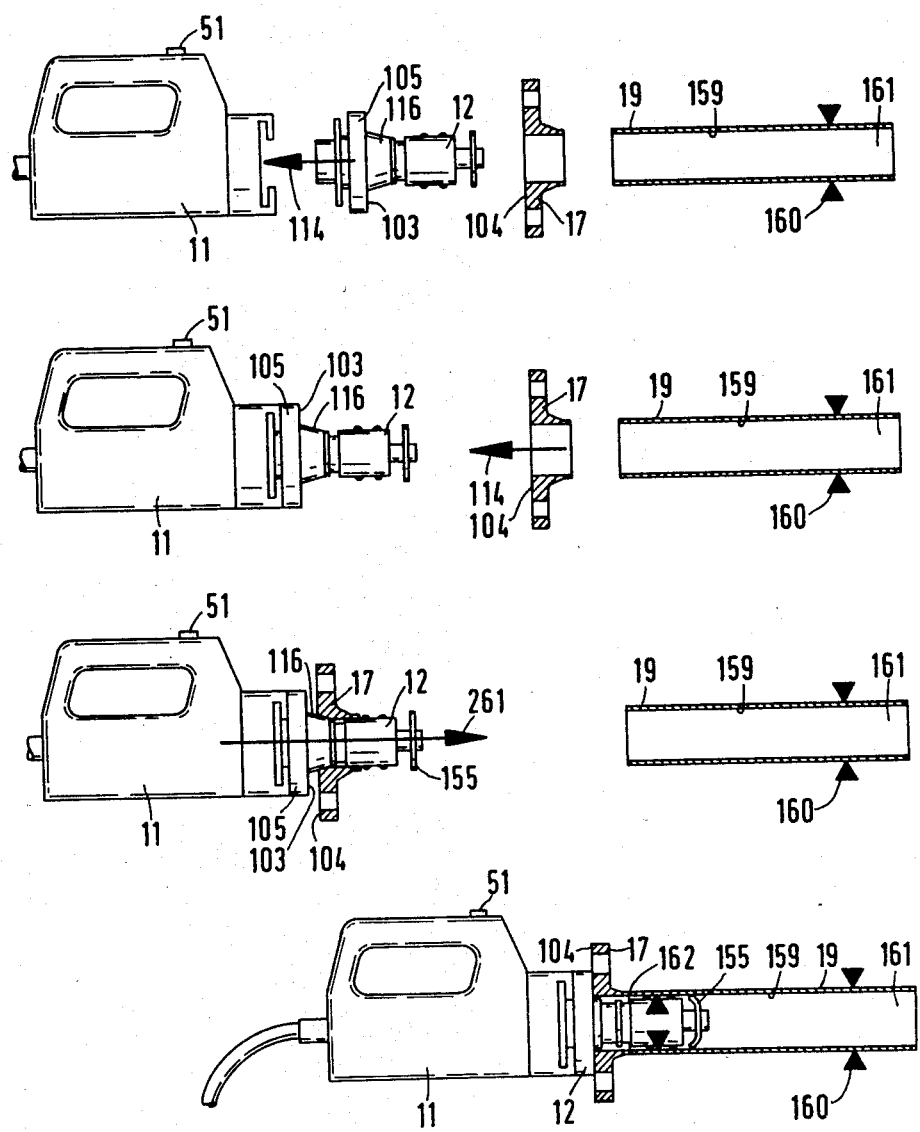
FIG. 6 is a functional sequence of the clamping/centering process with the clamping tool comprising clamping tongs/clamping pin.

FIG. 6 shows the functional sequence of clamping and centering of a V-flange 17 against a pipe 19 by means of the clamping tongs 11 and clamping pin 12. Prior to the clamping/centering of the V-flange 17 against the pipe 19, a clamping pin 12 is selected corresponding to the nominal width of the V-flange 17 and the interior diameter of the pipe. Subsequently the clamping pin 12 is coupled into the clamping tongs 11 by turning the coupling sections 99 of the coupling claws 72. This results in the always identical position determination of the clamping pins 12 in the clamping tongs 11 by means of locking of the centering bolt 87 (FIG. 3) into a centering box of the clamping pin 12 which box is not shown in detail. Simultaneously with the coupling of clamping tongs 11/clamping pin 12, the coupling bolt 66 is connected to the pressure propagation box 128 by means of circular segment 68 in the receiver part 131. The V-flange 17 is then moved onto the clamping pin 12 in the direction of the arrow 114.

The unit consisting of clamping tongs 11/clamping pin 12 with the V-flange 17 is introduced with the clamping block 95 into the interior boring 161 of the pipe 19 which is clamped in a box clamp 160 or a centering clamping block 22, namely under pressure and in the direction of the arrow 114 until the screw-on side 104 of the V-flange 17 rests against the face 103 of the contact flange 105 and the level 73 shows a horizontal position.

The double action cylinder 56 is affected by hydraulic oil when the pressure switch 51 is activated. The piston rod 57 moves in the direction of the arrow 261 and moves the chuck ring 140 and the secondary chuck ring 147 via coupling bolt 66, pressure propagation box 128, and pressure bolt 130 so that the balls 152 are pressed against the inside wall 159 of the pipe 19 by means of the wedge-shaped center portions 148 of the chuck rings 140, 147 and clamp the pipe in a centric manner. Simultaneously with the activation of the pressure switch for the clamping, the forming gas supply is switched on; however, due to a retardation element, the gas supply arrives to the welding point 162 with some time delay. The tension of the clamping body 95 causes the chuck ring 140 and the secondary chuck ring 147 to move in the direction of the arrow 261. The opening of the outlet borings 139 is initiated by this move. Forming gas flows via hose 52, canals 83, boring 127, space 134, annular slot 135, outlet borings 139 into the space formed by the inside wall 159 of the pipe 19 and the elastic packing washer 155. Thereby the flow direction of the forming gas is directly aimed at the seam root due to the angle 138 of the outlet borings 139.

Figure 7:
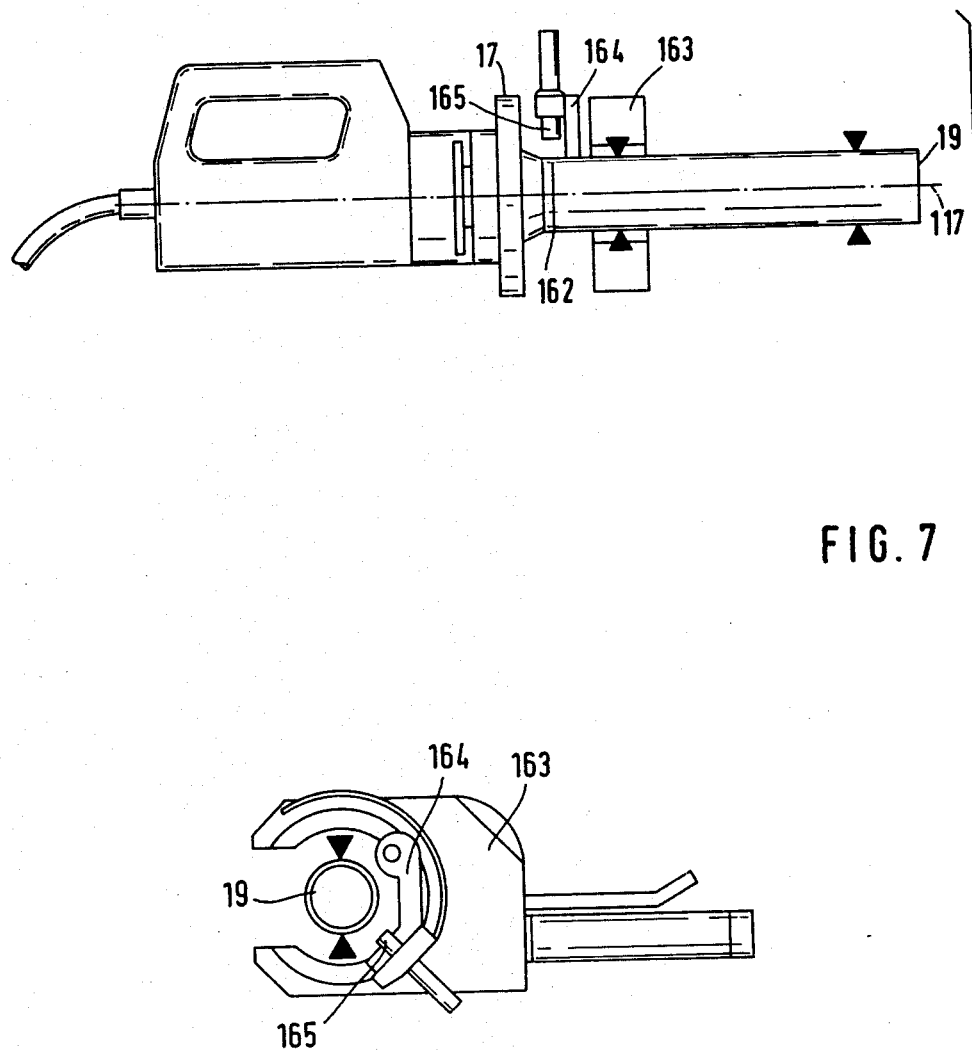
FIG. 7 is a functional sequence of the welding of a clamped/centered welding part.

FIG. 7 shows, schematically, the functional sequence of welding of a clamped/centered V-flange 17 to a pipe 19. The welding tongs or electrode holder 163 is applied from the side to the welding spot 162 on the pipe 19, adjusted vertically to the pipe axis 117 and fastened by means which are not represented in detail. A propelling mechanism 164 is provided on the welding tongs 163 and can be held in said welding tongs 163 and thus guided orbitally around the pipe 19. The welding torch 165, which is attached to the propelling mechanism 164 as are torch adjustment and suspension devices which are not shown in detail and a wire supply roll, will now be positioned in respect to various welding parameters, such as, for instance, height over the welding seam and width of the welding seam. Subsequently the welding is performed by means of the welding torch 165 which is attached to the propelling mechanism 164 and is orbitally guided thereby around the welding tongs 163 and the pipe 19. Thereby the welding torch 165 is preferably developed as a WIG welding torch.

Figure 8:
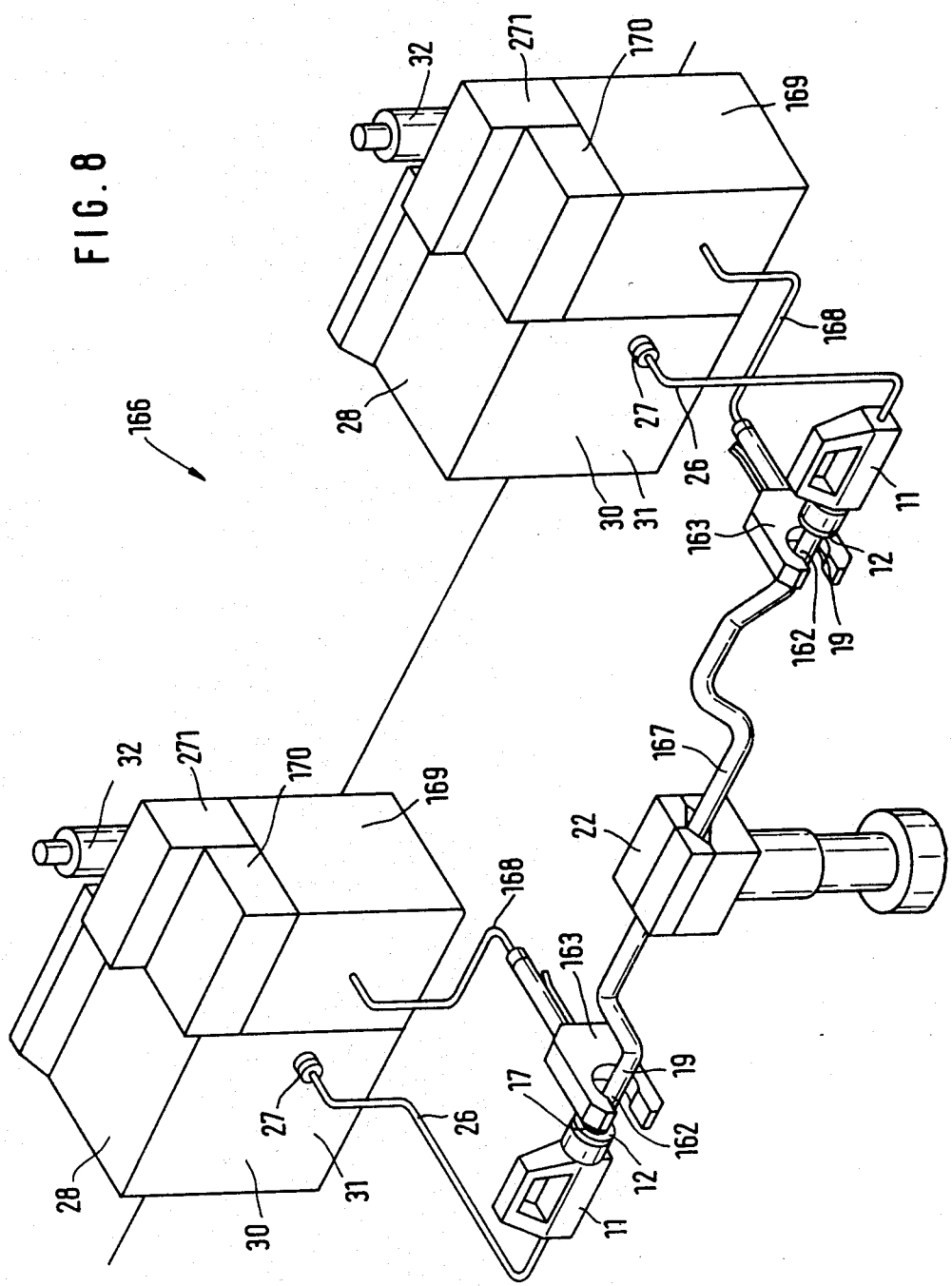
FIG. 8 is a perspective representative of the arrangement of the clamping unit welding tongs/clamping pin on a rotationally non-symmetrical pipeline.

FIG. 8 shows in greater detail and in perspective a welding work station 166 with two clamping units each consisting of clamping tongs 11/clamping pin 12 arranged at a rotationally non-symmetrical pipeline 167. The clamping unit consisting of clamping tongs 11/clamping pin 12 and welding tongs 163 is connected with the V-flange 17 and positioned in or on the pipe 19 in a manner corresponding to FIGS. 6 and 7 and the related descriptions. The pipeline 167 is held in a stationary centering clamping block 22 to prevent axial dislocation. Advantageously, the pipeline 167 can be worked on from two sides. The welding tongs 11 are connected to pumping equipment 28 with pneumatic drive 30 and pressure propagator 31 via pressure hoses 26 and rapid closure coupling 27. A protective gas bottle 32 is provided in order to supply the welding spot 162 with forming gas. The welding tongs 163 are connected to a welding transformer 169 via a line 168. Integrated into the welding transformer 169 are a control 170 designed as an individual part and a cold wire supply 271.

FIG. 9 is a schematic representation of the principle of the clamping pins or mandrels 14, 13 for interior clamping of pipe 19 against pipe 19 and of flared pipe 21 against pipe 19. The clamping pin 14 for connection of pipe to pipe 19 has two clamping units 171, 172 which can be moved against one another in the direction of the arrow 174 for purposes of centering the pipes 19 in the welding position. The axial movement in the direction of the arrow 174 takes place by means of a hydraulic cylinder located in the clamping unit 171, the piston rod 175 of which is connected to the clamping unit 172, said piston rod being guided in a hollow shaft 176. The radial clamping and centering of the pipes 19 is achieved by means of clamping units 171, 172 which are developed according to the principle of interior clamping jaws. The pipe clamping is achieved by means of three coaxially arranged clamping jaws 173. Since the clamping pressure is distributed on all of the clamping jaws 173, thinwalled pipes 19 can also be clamped without a loss of geometrical form of the pipes 19.

The clamping pin 13 for connection of flared pipe 21 to pipe 19 has a clamping unit 171 for radial clamping and centering of the pipe 19 to the flared pipe 21. The clamping unit 171 is also developed according to the principle of an interior clamping device with three clamping jaws 173. An axial clamping unit 178 is attached via a spring/shaft device 179 to the front face 177 of the clamping unit 171 in such a manner that its axial length can be adjusted. In the axial clamping device 178, two clamping bodies 180, 181 are arranged so that they can be moved in the direction of the arrow A—A, namely by means of a double action hydraulic cylinder which is not shown in detail.

Lamellar clamping pins can also be advantageously used instead of the clamping jaw pins 13, 14.

Figure 10:
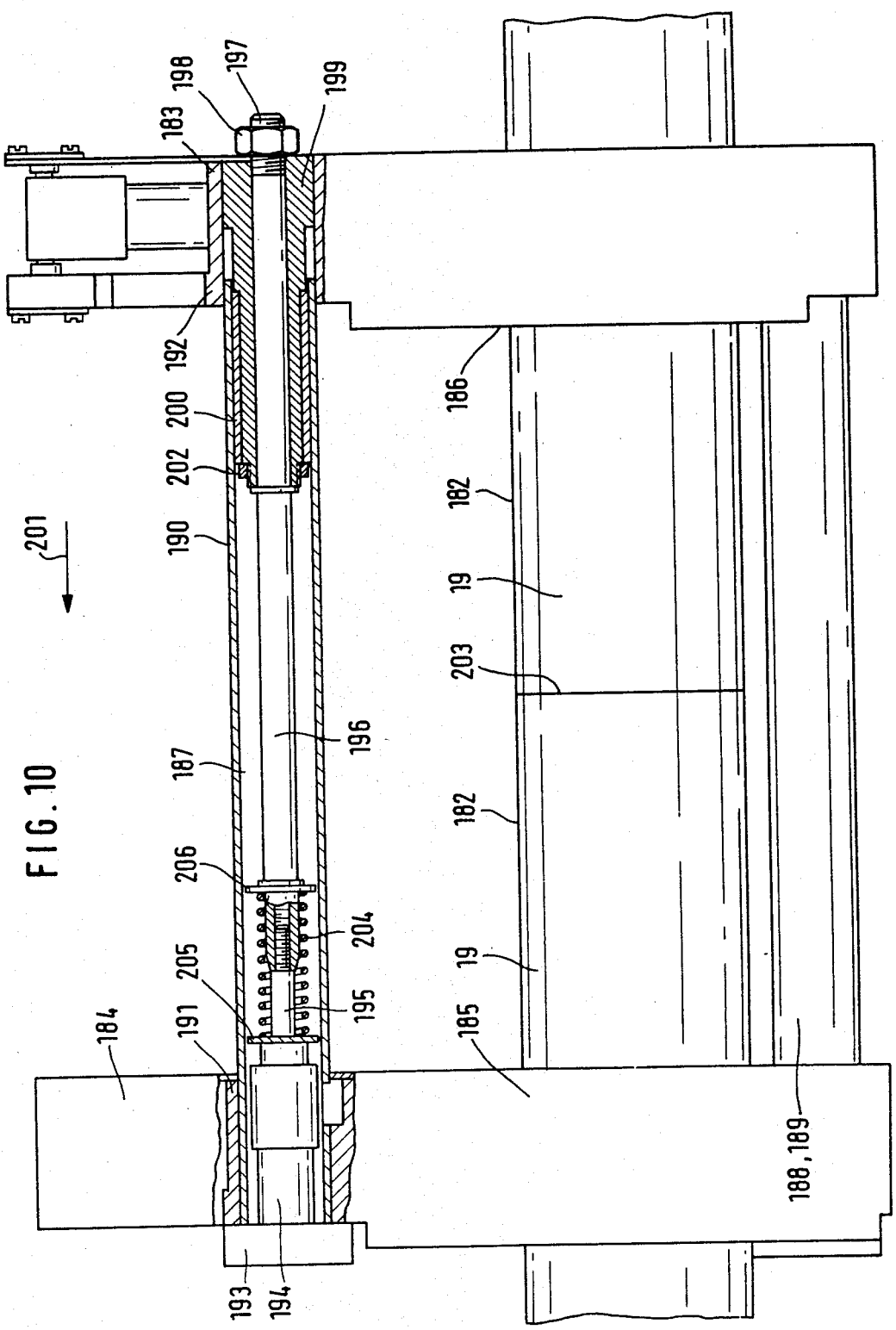
FIG. 10 is a side view of the clamping tongs for external clamping of pipe to pipe, partial section.

FIGS. 10 and 11 show schematic partial sections of the side and front views of the clamping device 16 for pipe 19 against pipe 19. The clamping device 16 has two clamping units 183, 184 grasping the outside circumference 182 of the pipe each one with a face plate 185, 186 and movable in relation to one another by means of guides 187, 188, 189. The structure of the guides 187, 188, 189 is the same and is described in greater detail with reference to the guide 187. The guide 187 consists of a hollow shaft 190 guided in the bearings 191, 192 of the clamping units 183, 184, the axial end position of which shaft is limited by means of the screw-on flange 193 of the single action hydraulic cyclinder 194. The single action hydraulic cylinder 194 is arranged in the hollow shaft 190 and connected with a tie rod 196 via the piston rod 195. That portion of the tie rod 196 which extends outside of the clamping unit 183 is developed as a threaded bolt 197. The tie rod 196 is connected with the clamping unit 183 by means of a nut 198 on the threaded bolt 197. Glued into the bearing 192 of the clamping unit 183, on the side oriented towards the clamping unit 183, there is a guide bolt 199 with glide box 200 which accommodates and guides the hollow shaft 190. The guide bolt 199 is connected to the tie rod 196 by means of a compression screw fastening 202. If the single action hydraulic cylinder 194 is activated in the direction of the arrow 201, the pipes 19 are moved towards one another until the contact surfaces of the ends 203 rest against one another. The single action hydraulic cylinder 194 is moved into the starting position by means of a spring 204 which is arranged between two discs or washers attached to piston rod 195 and tie rod 196. The clamping and centering of the pipe 19 in the radial direction takes place on the outside circumference 182 of the pipe by means of one of the face plates 185, 186 related to the clamping units. The self-centering face plate 185 has three clamping jaws 207, 208, 209 which are turned by means of activating the double action hydraulic cylinder 210, and as a result the pipe 19 is clamped or released.

What is claimed is:

1. A holding, centering and positioning assembly for the selective welding together of sections of a pipe to a flange or flare and of a pipe to a pipe and of a pipe to a flared out pipe wherein the sections can be welded together in the held and centered welding position, comprising a power unit, a plurality of portable and manually operable holding and centering and positioning devices for aligning the sections and pressing the sections together at the welding joint, each of said devices including a pair of clamping units, one of said clamping units of one of said devices having a resiliently biased centering sleeve having a tapered contacting surface, the remainder of said clamping units having section contacting elements, means for selectively moving each of said contacting elements into engagement with the surface of the sections, said clamping units being interconnected by reciprocating means, said reciprocating means in one of said devices comprising said means for selectively moving said section contacting elements of one of its clamping units into engagement with a respective section, said reciprocating means in at least one of said other devices comprising means for selectively longitudinally moving its clamping units toward each other for axially moving the sections into pressing contact with each other, and means for operatively selectively connecting each of said devices with said power unit for selectively operating said devices.

2. The assembly of claim 1 wherein said plurality of devices includes four separate devices, one of said devices comprising a portable and manually operable mandrel holder having a first mandrel detachably connected thereto for clamping engagement with the interior surfaces of a pipe and of a flange or flare, one of said devices comprising a second mandrel for clamping engagement with the interior surfaces of a pipe and a pipe, one of said devices comprising a third mandrel for clamping engagement with the interior surfaces of a pipe and a flared out pipe, and one of said devices comprising an external clamp for clamping engagement with the exterior surfaces of a pipe and a pipe.

3. The assembly of claim 2 wherein said one device for the welding together of sections of a pipe to a flange or flare includes a coupling for connection to said power unit, said first mandrel including said pair of coaxial clamping units, one of said first mandrel clamping units being said centering sleeve for engagement with the flange or flare, a plurality of said contacting elements being at the outer surface of the other of said first mandrel clamping units for engagement with the inner surface of the pipe section, said one clamping unit of said first mandrel including a contact member having an exposed axial recess in a face perpendicular thereto, said centering sleeve comprising a guide box telescopically extending from said recess, said guide box having a tapered outer surface whereby the flange or flare to be welded may be moved on said guide box with the inner bore of the flange or flare being guided up said tapered outer surface, said tapered outer surface of said guide box being said contacting surface of said one clamping unit, resilient means urging said guide box in a direction away from said contact member, and said guide box being movable in a direction toward said recess against the force of said resilient means until the flange or flare contacts said perpendicular face of said contact member when the pipe section is pressed against the flange or flare.

4. The assembly of claim 3 wherein said other clamping unit of said first mandrel includes at least one chuck having a cylindrical outer surface merging into an outwardly tapered outer surface, said contacting elements of said other clamping unit comprising a set of balls disposed against said outer surface of said chuck, means for axially moving said chuck whereby said balls are in non-contacting relation with the pipe when said balls ride against said cylindrical outer surface and are in contacting relation when said balls ride against said tapered outer surface of said chuck, said reciprocating means for moving said section contacting elements comprising a cylinder in said mandrel holder, a piston extending recopricatingly from said cylinder, a pressure bolt extending axially through said guide box and through said chuck, said pressure bolt being connected to said piston, and said pressure bolt having a shoulder disposed against said chuck for moving said chuck when said piston is extended to cause said balls to contact the pipe.

5. The device of claim 4 including a plurality of passageways extending through said mandrel holder and said first mandrel, said passageways communicating with each other, means for supplying protective gas through said passageways, said passageways including an outlet passageway at the welding joint selectively opened and closed by said chuck whereby said outlet passageway is closed when said balls are in their non-contacting position and said outlet passageway is opened when said balls are in their contacting position, and a washer on said pressure bolt for sealing contact with the inner surface of the pipe to confine the protective gas at the welding joint.

6. The assembly of claim 2 wherein said second mandrel includes said pair of clamping units being axially aligned, a cylinder in one of said clamping units of said second mandrel, and a piston reciprocatingly extending from said cylinder and connected to the other of clamping units of said second mandrel for moving said clamping units of said second mandrel toward each other upon retraction of said piston.

7. The assembly of claim 2 wherein said third mandrel for the welding together of a pipe to a flared out pipe including said pair of spaced clamping units, said contacting elements comprising a first set of contacting elements at the outer surface of one of said third mandrel clamping units for clamping engagement with the interior surface of a pipe and a second set of contacting elements at the outer surface of the other clamping unit for clamping engagement with the interior surface of a flared out pipe, a cylinder in said one clamping unit of said third mandrel, a piston extending from said cylinder, the other of said third mandrel clamping units being mounted to said piston, said other third mandrel clamping unit including a pair of spaced clamping bodies which comprises second set of contacting elements, said clamping bodies being movable toward and away from each other in a direction perpendicular to the axis of said piston whereby said clamping bodies may be inserted through the flared portion and into the main portion of a flared out pipe when said clamping bodies are moved toward each other and whereby said clamping bodies may be moved into clamping contact with the shoulder at the junction of the flared portion and the main portion of the flared out pipe when said clamping bodies are moved away from each other, and means for retracting said piston into said cylinder for moving said actuating units toward each other for pressing the pipe against the flared out pipe at the welding joint.

8. The assembly of claim 2 wherein each of said external clamping device clamping units comprises an end plate having an arcuate surface adapted to be positioned around the outside of a pipe, said contacting elements being a plurality of contact elements extending from said arcuate surface in a direction toward the center of the arc, a plurality of guide shafts fixedly connected at one end to one of said end plates and telescopically received at its other end in the other of said end plates, and means for moving said end plates toward each other for drawing said clamping units closer together to press the pipes against each other at the welding joint.

9. The assembly of claim 8 wherein said guide shafts are hollow, said means for moving said end plates comprising a cylinder in each of said guide shafts fixedly mounted to said one end plate, a piston reciprocatingly extending from said cylinder, and a bolt mounted to said piston and secured to said other end plate whereby retraction of said piston causes said other end plate to further telescope over said guide shaft and move closer to said one end plate.

10. The assembly of claim 1 wherein said device for the welding together of sections of a pipe to a flange or flare comprises a portable and manually operable mandrel holder including a coupling for connection to said power unit, a mandrel detachably connected to said mandrel holder whereby one of a number of mandrels may be connected thereto, said mandrel including said pair of coaxial clamping units, one of said clamping units being said centering sleeve for engagement with the flange or flare, a plurality of said contacting elements being at the outer surface of the other of said clamping units for engagement with the inner surface of the pipe section, said one clamping unit of said mandrel includes a contact member having an exposed axial recess in a face perpendicular thereto, said centering sleeve comprising a guide box telescopically extending from said recess, said guide box having a tapered outer surface whereby the flange or flare to be welded may be moved on said guide box with the inner bore of the flange or flare being guided up said tapered outer surface, said tapered outer surface of said guide being said contacting surface of said one clamping unit, resilient means urging said guide box in a direction away from said contact member, and said guide box being movable in a direction toward said recess against the force of said resilient means until the flange or flare contacts said perpendicular face of said contact member when the pipe section is pressed against the flange or flare.

11. The assembly of claim 10 wherein said other clamping unit of said mandrel includes at least one chuck having a cylindrical outer surface merging into an outwardly tapered outer surface, said contacting elements of said other clamping unit comprising a set of balls disposed against said outer surface of said chuck, means for axially moving said chuck whereby said balls are in non-contacting relation with the pipe when said balls ride against said cylindrical outer surface and are in contacting relation when said balls ride against said tapered outer surface of said chuck, said reciprocating means for moving said section contacting elements comprising a cylinder in said mandrel holder, a piston extending reciprocatingly from said cylinder, a pressure bolt extending axially through said guide box and through said chuck, said pressure bolt being connected to said piston, and said pressure bolt having a shoulder disposed against said chuck for moving said chuck when said piston is extended to cause said balls to contact the pipe.

12. The assembly of claim 11 including a plurality of passageways extending through said mandrel holder and said mandrel, said passageways communicating with each other, means for supplying protective gas through said passageways, said passageways including an outlet passageway at the welding joint selectively opened and closed by said chuck whereby said outlet passageway is closed when said balls are in their non-contacting position and said outlet passageway is opened when said balls are in their contacting position, and a washer on said pressure bolt for sealing contact with the inner surface of the pipe to confine the protective gas at the welding joint.

13. The assembly of claim 1 wherein said device for the welding together of a pipe to a flared out pipe includes said contacting elements comprising a first set of contacting elements at the outer surface of one of said clamping units for clamping engagement with the interior surface of a pipe and a second set of contacting elements at the outer surface of the other clamping unit for clamping engagement with the interior surface of a flared out pipe, a cylinder in said one clamping unit, a piston extending from said cylinder, the other of said clamping units being mounted to said piston, said other clamping unit including a pair of spaced clamping bodies which comprises said second set of contacting elements, said clamping bodies being movable toward and away from each other in a direction perpendicular to the axis of said piston whereby said clamping bodies may be inserted through the flared portion and into the main portion of a flared out pipe when said clamping bodies are moved toward each other and whereby said clamping bodies may be moved into clamping contact with the shoulder at the junction of the flared portion and the main portion of the flared out pipe when said clamping bodies are moved away from each other, and means for retracting said piston into said cylinder for moving said clamping units toward each other for pressing the pipe against the flared out pipe at the welding joint.

14. The assembly of claim 1 wherein each of said clamping units of said device for the welding together of a pipe to a pipe comprises an end plate having an arcuate surface adapted to be positioned around the outside of a pipe, said contacting elements being a plurality of contact elements extending from said arcuate surface in a direction toward the center of the arc, a plurality of guide shafts fixedly connected at one end to one of said end plates and telescopically received at its other end in the other of said end plates, and means for moving said end plates toward each other for drawing said clamping units closer together to press the pipes against each other at the welding joint.

15. The assembly of claim 14 wherein said guide shafts are hollow, said means for moving said end plates comprising a cylinder in each of said guide shafts fixedly mounted to said one end plate, a piston reciprocatingly extending from said cylinder, and a bolt mounted to said piston and secured to said other end plate whereby retraction of said piston causes said other end plate to further telescope over said guide shaft and move closer to said one end plate.

16. A holding, centering and positioning device for the welding together of sections of a pipe to a flange or flare, comprising a portable and manually operable mandrel holder including a coupling for connection to a source of power, a mandrel detachably connected to said mandrel holder whereby one of a number of mandrels may be connected thereto, said mandrel including a pair of coaxial clamping units, section contacting means at the outer surface of one of said clamping units for engagement with the flange or flare, section contacting elements at the outer surface of the other of said clamping units for engagement with the inner surface of the pipe section, said one clamping unit includes a contact member having an exposed axial recess in a face perpendicular thereto, a guide box telescopically extending from said recess, said guide box having a tapered outer surface whereby the flange or flare to be welded may be moved on said guide box with the inner bore of the flange or flare being guided up said tapered outer surface, said tapered outer surface of said guide box being said section contacting means of said one clamping unit, resilient means urging said guide box in a direction away from said contact member, and said guide box being movable in a direction toward said recess against the force of said resilient means until the flange or flare contacts said perpendicular face of said contact member when the pipe section is pressed against the flange or flare.

17. The device of claim 16 wherein said other clamping unit includes at least one chuck having a cylindrical outer surface merging into an outwardly tapered outer surface, said contacting elements of said other clamping unit comprising a set of balls disposed against said outer surface of said chuck, and means for axially moving said chuck whereby said balls are in non-contacting relation with the pipe when said balls ride against said cylindrical outer surface and are in contacting relation when said balls ride against said tapered outer surface of said chuck.

18. The device of claim 17 wherein said means for axially moving said chuck comprises a cylinder in said mandrel holder, a piston extending reciprocatingly from said cylinder, a pressure bolt extending axially through said guide box and through said chuck, said pressure bolt being connected to said piston, and said pressure bolt having a shoulder disposed against said chuck for moving said chuck when said piston is extended to cause said balls to contact the pipe.

19. The device of claim 17 including a plurality of passageways extending through said mandrel holder and said mandrel, said passageways communicating with each other, means for supplying protective gas through said passageways, said passageways including an outlet passageway at the welding joint selectively opened and closed by said chuck whereby said outlet passageway is closed when said balls are in their non-contacting position and said outlet passageway is opened when said balls are in their contacting position, and a washer on said pressure bolt for sealing contact with the inner surface of the pipe to confine the protective gas at the welding joint.

20. The device of claim 19 including a second chuck having a second set of balls for selective contact with the inner surface of the pipe.

21. The device of claim 20 including a resiliently mounted arresting bolt for insertion into a hole of the flange being welded, and a level on said mandrel holder.

22. A holding, centering and positioning device for the welding together of a pipe to a flared out pipe comprising a pair of spaced clamping units, a contacting means at the outer surface of one of said clamping units, means for urging said contacting means outward into clamping engagement with the interior surface of a pipe, a cylinder in said one clamping unit, a piston extending from said cylinder, the other of said clamping units being mounted to said piston, said other clamping unit including a pair of spaced clamping bodies, said clamping bodies being movable toward and away from each other in a direction perpendicular to the axis of said piston whereby said clamping bodies may be inserted through the flared portion and into the main portion of a flared out pipe when said clamping bodies are moved toward each other and whereby said clamping bodies may be moved into clamping contact with the shoulder at the junction of the flared portion and the main portion of the flared out pipe when said clamping bodies are moved away from each other, and means for retracting said piston into said cylinder for moving said clamping units toward each other for pressing the pipe against the flared out pipe at the welding joint.

23. A holding, centering and positioning device for the welding together of a pipe to pipe comprising a pair of spaced clamping units, each clamping unit comprising a unitary non-segmented end plate having an arcuate surface adapted to be positioned around the outside of a pipe, a plurality of individual contact elements extending from said arcuate surface in a direction toward the center of the arc, means for radially moving said contact elements into clamping engagement with a pipe, a plurality of guide shafts fixedly connected at one end to one of said end plates and telescopically received at its other end in the other said end plated, means for moving said end plates toward each other for drawing said clamping units closer together to press the pipes against each other at the welding joint, said guide shafts being hollow, said means for moving said end plates comprising a cylinder in each of said guide shafts fixedly mounted to said one end plate, a piston reciprocatingly extending from said cylinder, and a bolt mounted to said piston and secured to each other end plate whereby retraction of said piston causes said other end plate to further telescope over said guide shaft and move closer to said one end plate.

24. A holding, centering and positioning device for selective welding together of sections of a pipe against a flange or flare wherein the sections can be welded together in the held and centered welding position comprising a pressure unit for feeding a fluid medium to mandrel means, said mandrel means includes a mandrel, said mandrel having a support flange perpendicular to its longitudinal axis for contacting the flange or flare, said mandrel further having section contacting members which are movable in a direction radial to said longitudinal axis, said section contacting members being located at the outer surface of said mandrel, said mandrel means comprising a control means for causing the radial movement of said section contacting members, said mandrel including chuck rings having conical outer surfaces, said section contacting members riding against said conical outer surfaces, said control means selectively shifting said chuck rings in an axial direction for causing said radial movement of said section contacting members, said mandrel including a protective gas passageway, and said protective gas passageway having outlets directed at the root of a welding seam for said pipe section and said flange or flare for sealing the interior space of the root.

25. The device of claim 24 wherein said mandrel means is a portable chuck having coupling means for engagement with different size mandrels.

26. The device of claim 25 wherein said chuck includes a coupling bolt which is axially movable under the influence of said medium and which shifts said section contacting members by means of a pressure bolt.

27. The device of claim 26 wherein said chuck rings are mounted on said pressure bolt, one of said chuck rings contacting a pressure flange connected to said pressure bolt, and the other of said chuck rings being connected to said one chuck ring by means of a spring.

28. The device of claim 25 wherein the upper part of said chuck is in the form of a handle having a control switch for controlling the on/off flow of said medium.

29. The device of claim 24 wherein said section contacting members are balls movable in bores in a swiveling part surrounding said chuck rings.

30. The device of claim 29 including a device for positioning sections of a pipe against a flange or flare comprising a pressure unit for feeding a fluid medium to a mandrel holder, a mandrel connected to said mandrel holder, said mandrel having a support flange perpendicular to its longitudinal axis for contacting the flange or flare, said mandrel further having section contacting members which are movable in a direction radial to said longitudinal axis, said section contacting members being located at the outer surface of said mandrel, said mandrel holder comprising a control means for causing the radial movement of said section contacting members, said mandrel including chuck rings having conical outer surfaces, said section contacting members riding against said conical outer surfaces, said control means selectively shifting said chuck rings in an axial direction for causing said radial movement of said section contacting members, said section contacting members being balls movable in bores in a swiveling part surrounding said chuck rings, a protective gas passageway in said chuck and said mandrel, said passageway having an outlet directed at the root of a welding seam for said pipe section to said flange or flare for sealing the interior space of the pipe, and an elastic sealing washer mounted on said mandrel.

31. The device of claim 30 wherein said outlet consists of outlet bores in said swiveling part which are closed when said section contacting members are out of contact with said conical outer surfaces of said chuck rings and are open when said section contacting members are in contact with said conical outer surfaces.

32. The device of claim 24 wherein a fluid level and an arresting bolt are attached to said support flange.

33. The device of claim 24 wherein said mandrel means comprises a mandrel connected to a mandrel holder.

34. A device for positioning sections of a pipe against a flange or flare comprising a pressure unit for feeding a fluid medium to a mandrel holder, a mandrel connected to said mandrel holder, said mandrel having a support flange perpendicular to its longitudinal axis for contacting the flange or flare, said mandrel further having section contacting members which are movable in a direction radial to said longitudinal axis, said section contacting members being located at the outer surface of said mandrel, said mandrel holder comprising a control means for causing the radial movement of said section contacting members, said mandrel including chuck rings having conical outer surfaces, said section contacting members riding against said conical outer surfaces, said control means selectively shifting said chuck rings in an axial direction for causing said radial movement of said section contacting members, said section contacting members being balls movable in bores in a swiveling part surrounding said chuck rings, a circular opening being in said support flange, and a conical box being resiliently axially movable in said opening along a guide surface of said swiveling part and up to a stop face.

* * * * *